US012618946B2

(12) United States Patent
Zhou

(10) Patent No.: US 12,618,946 B2
(45) Date of Patent: May 5, 2026

(54) OPTICAL POSITIONING AND NAVIGATING SYSTEM

(71) Applicant: U.S. Army DEVCOM, Army Research Laboratory, Adelphi, MD (US)

(72) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1175 days.

(21) Appl. No.: 17/500,092

(22) Filed: Oct. 13, 2021

(65) Prior Publication Data
US 2023/0113535 A1 Apr. 13, 2023

(51) Int. Cl.
| | |
|---|---|
| *H04B 10/40* | (2013.01) |
| *G01C 21/00* | (2006.01) |
| *G01S 7/48* | (2006.01) |
| *G01S 7/484* | (2006.01) |
| *G01S 7/4861* | (2020.01) |
| *G01S 17/10* | (2020.01) |
| *G01S 17/86* | (2020.01) |
| *H01S 3/00* | (2006.01) |
| *G01S 7/481* | (2006.01) |
| *H04B 10/11* | (2013.01) |
| *H04B 10/112* | (2013.01) |
| *H04B 10/114* | (2013.01) |
| *H04B 10/50* | (2013.01) |

(52) U.S. Cl.
CPC ........ *G01S 7/4808* (2013.01); *G01C 21/3844* (2020.08); *G01S 7/484* (2013.01); *G01S 7/4861* (2013.01); *G01S 17/10* (2013.01); *G01S 17/86* (2020.01); *H01S 3/0085* (2013.01); *G01S 7/4817* (2013.01); *H04B 10/11* (2013.01); *H04B 10/112* (2013.01); *H04B 10/114* (2013.01); *H04B 10/40* (2013.01); *H04B 10/50* (2013.01)

(58) Field of Classification Search
CPC ...... G01S 7/4808; G01S 7/484; G01S 7/4861; G01S 17/10; G01S 17/86; G01S 7/4817; G01C 21/3844; G01C 15/002; G01C 21/1652; H01S 3/0085; H04B 10/11; H04B 10/112; H04B 10/114; H04B 10/40; H04B 10/50
USPC ................ 398/118–131, 135–139, 140–172, 398/182–201
See application file for complete search history.

(56) References Cited

U.S. PATENT DOCUMENTS

| | | | |
|---|---|---|---|
| 4,504,143 A | 3/1985 | Heinze et al. | |
| 4,647,784 A * | 3/1987 | Stephens ............. | G05D 1/0297 250/559.3 |

(Continued)

*Primary Examiner* — Dibson J Sanchez
(74) *Attorney, Agent, or Firm* — Eric B. Compton

(57) ABSTRACT

A method, apparatus and system for performing optical positioning. The apparatus comprises a laser transmitter configured to transmit a laser beam toward a retroreflector, where the location of retroreflector is known and the retroreflector reflects the laser beam and imparts modulation onto the laser beam. An optical receiver receives the reflected laser beam reflected from the retroreflector and a processor extracts a code from the modulation, determines the location of the retroreflector and calculates the distance from the apparatus to the retroreflector and uses the code and distance to determine a position of the apparatus.

21 Claims, 4 Drawing Sheets

(56)                References Cited

U.S. PATENT DOCUMENTS

| | | | | |
|---|---|---|---|---|
| 4,918,607 A * | 4/1990 | Wible | G01S 17/87 | |
| | | | 180/169 | |
| 5,076,690 A * | 12/1991 | deVos | G01C 15/002 | |
| | | | 356/3.01 | |
| 5,301,005 A * | 4/1994 | deVos | G01C 15/002 | |
| | | | 356/3.11 | |
| 5,920,394 A * | 7/1999 | Gelbart | G01S 17/66 | |
| | | | 356/615 | |
| 6,154,299 A * | 11/2000 | Gilbreath | H04B 10/2587 | |
| | | | 398/1 | |
| 6,208,916 B1 * | 3/2001 | Hori | G05D 1/0246 | |
| | | | 701/28 | |
| 6,249,743 B1 * | 6/2001 | Ohshimo | G05D 1/0244 | |
| | | | 701/408 | |
| 6,400,452 B1 | 6/2002 | Maynard | | |
| 6,618,132 B1 * | 9/2003 | Vann | G01S 17/46 | |
| | | | 235/494 | |
| 7,337,961 B2 | 3/2008 | Cato | | |
| 7,681,796 B2 * | 3/2010 | Cato | G05D 1/0244 | |
| | | | 235/462.16 | |
| 2007/0297805 A1 * | 12/2007 | Rabinovich | H04B 10/2587 | |
| | | | 398/151 | |
| 2008/0000990 A1 * | 1/2008 | Thomas | G06K 19/0723 | |
| | | | 235/494 | |
| 2011/0170118 A1 * | 7/2011 | Mika | G05D 1/0234 | |
| | | | 324/207.13 | |
| 2012/0087452 A1 * | 4/2012 | Zerbe | H03K 5/1252 | |
| | | | 375/354 | |
| 2012/0259465 A1 * | 10/2012 | Chen | G05D 1/0234 | |
| | | | 901/1 | |
| 2016/0026185 A1 * | 1/2016 | Smith | G05D 1/0231 | |
| | | | 356/614 | |
| 2016/0100521 A1 * | 4/2016 | Halloran | G01S 17/06 | |
| | | | 180/169 | |
| 2018/0081094 A1 * | 3/2018 | Aikin | G08G 1/017 | |
| 2018/0361232 A1 * | 12/2018 | Mallinson | A63F 13/98 | |
| 2019/0196018 A1 * | 6/2019 | Zhong | G01S 17/06 | |
| 2019/0291899 A1 * | 9/2019 | Cameron | G01C 21/18 | |
| 2022/0366596 A1 * | 11/2022 | Katsura | G05D 1/249 | |

* cited by examiner

OPTICAL POSITIONING AND NAVIGATING SYSTEM

GOVERNMENT INTEREST

The invention described herein may be manufactured, used and licensed by or for the U.S. Government.

BACKGROUND

Field

Embodiments of the present invention generally relate to positioning systems and, more specifically, to optical positioning systems.

Description of the Related Art

Devices that determine their position have become ubiquitous. Nearly every mobile smartphone includes a Global Navigation Satellite System (GNSS) receiver such as a Global Positioning System (GPS) receiver. Such receivers rely upon radio frequency (RF) signals transmitted from a constellation of satellites to compute the position of the receiver. Unfortunately, GPS satellites are costly and the RF signals they transmit can be blocked or jammed resulting in a receiver not being able to compute its position.

Therefore, there is a need in the art for a positioning system that does not rely on RF signals to compute a position.

SUMMARY

Embodiments of the present invention include an optical positioning system comprising a laser transceiver and a plurality of -retroreflectors, where the system computes a position of the laser transceiver based upon reflected light from the retroreflectors in accordance with the following description and drawings.

BRIEF DESCRIPTION OF THE DRAWINGS

So that the manner in which the above recited embodiment of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention include optical positioning system comprising an end-user laser transceiver device/unit (hereinafter referred to as the device or end user device) and a plurality of retroreflectors. In one embodiment, the device emits a laser beam that is reflected by a retroreflector. The retroreflector modulates the reflected laser beam with a unique code. The reflected laser beam is received by the device and the code is extracted from the received signal. In one embodiment, the code is correlated with a reference location of the retroreflector and the device computes a distance between the device and the reference location by the round trip travel time of the laser light. In another embodiment, the code may contain the reference location. The laser beam is pointed toward at least two additional retroreflectors to identify two additional reference locations and a distance of the device to those locations. Using the distance to each of the three reference locations and the reference locations, the device computes its position.

In other embodiments, the device may include an automated laser scanner to rotationally scan the laser beam or to point the laser beam at the expected location of a particular retroreflector. The geographic locations of the retroreflectors may be contained in a database located within the device or external to the device, based on the device's location, may compute the relative location of the retroreflectors relative to the device to assist in pointing the laser. Alternatively or additionally, the device may display a map showing the device's location and the location of retroreflectors in the vicinity of the device. The laser may then be manually pointed toward additional retroreflectors to determine additional reference locations and ranges.

In other embodiments, the device may comprise a compass and an inertial measurement unit (IMU) to allow the device to serve as a navigation unit and track its position while moving. With an IMU, the device can be moved between determining reference locations and the IMU information may be used to adjust the distances measured to each reference location such that the device's position may be determine even if it is moved between retroreflector measurements.

Figure 1:
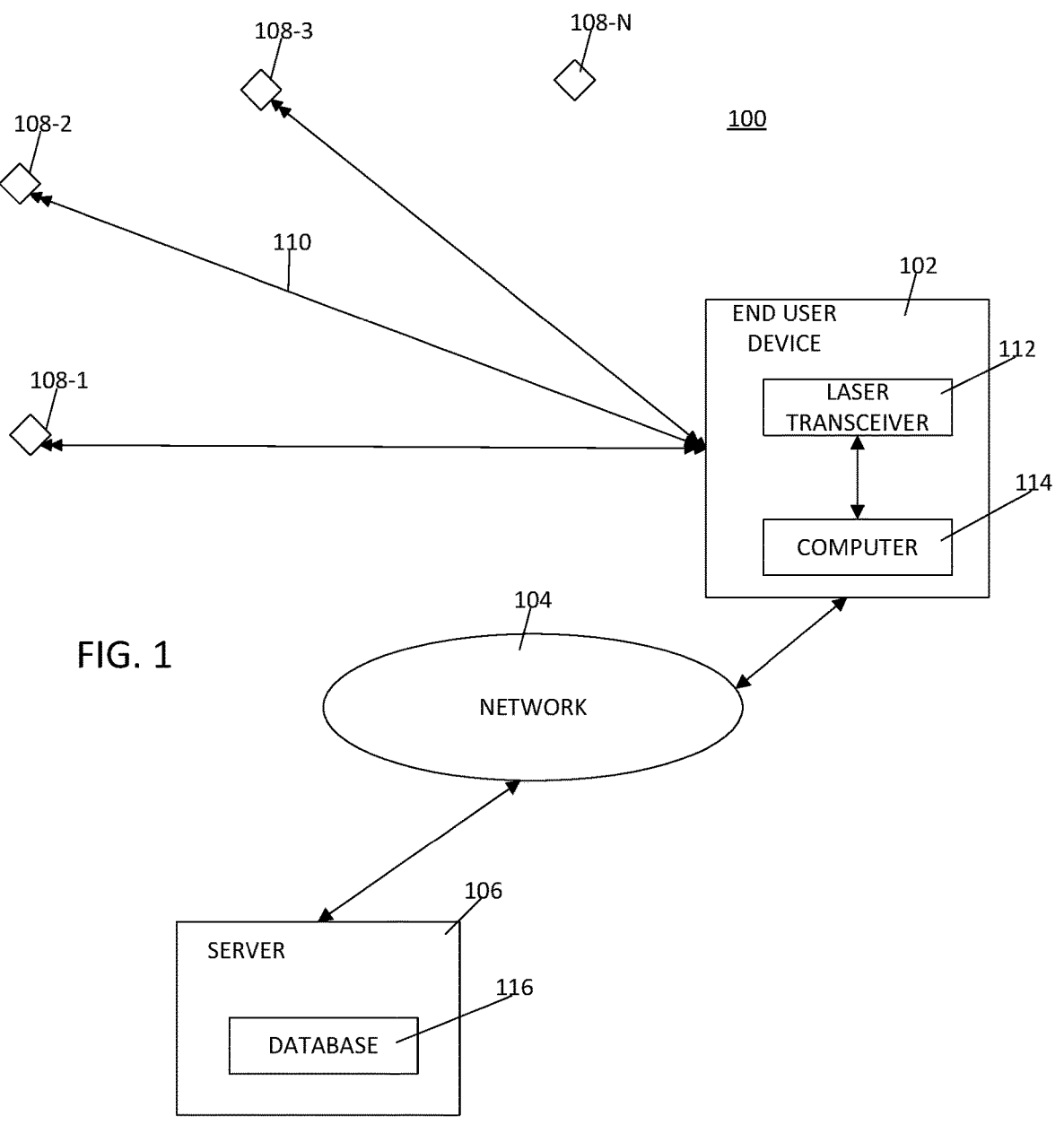
FIG. 1 depicts a block diagram of an optical positioning system in accordance with at least one embodiment of the present invention.

FIG. 1 depicts a block diagram of an optical positioning system (OPS) 100 in accordance with an embodiment of the present invention. In the exemplary embodiment, the OPS 100 comprises at least one end-user device 102 and a plurality of retroreflectors 108-1, 108-2, 108-3 . . . 108-N (collectively referred to as retroreflectors 108). The end-user device may be a hand-held navigation unit or may be attached to a mobile platform such as a ground vehicle or unmanned aerial vehicle (UAV). In one embodiment, the end-user device comprises a laser transceiver 112 for interacting with the retroreflectors and a computer 114 for determining the position of the end-user device 102. In another embodiment, the end-user device 102 may optionally communicate with a communications network 104 to send and receive information from/to a server 106.

The end-user device 102 transmits and receives a laser beam 110 that is aimed at the retroreflectors 108. Generally, to compute an accurate position, the device 102 gathers reflected signals from three or more retroreflectors 108. Details of the end-user device 102 are described below with respect to FIG. 2.

The retroreflectors 108 may passively pattern or actively modulate the reflected laser beam. In either case, the retroreflectors 108 are each coded with a unique pattern such that the reflected laser beam is modulated with a unique code that identifies each individual retroreflector. The retroreflectors 108 each define a reference point (location). The retroreflectors may be traditional "corner-cube" or "cat-eye" optical retroreflectors or may be metasurface retroreflectors.

An active retroreflector has the capability to constantly modulate the intensity of the incident light with a digital code that is programed with an electronic circuit. Whether active or passive, once the laser beam is reflected from a retroreflector, it has been modulated, in time or space, by the retroreflector with the retroreflector's identification code. Once the device 102 extracts the code from the reflected signal, the device obtains geographic location coordinates of the retroreflector. The end-user device 102 also determines the distance between the device and the retroreflector. Once the end-user device 102 identifies three reference points, it calculates its own position coordinates using a triangulation algorithm such as a three-dimensional Pythagorean Theorem having the form:

$$r1^2 = (x - x1)^2 + (y - y1)^2 + (z - z1)^2$$
$$r2^2 = (x - x2)^2 + (y - y2)^2 + (z - z2)^2$$
$$r3^2 = (x - x3)^2 + (y - y3)^2 + (z - z3)^2$$

where: r1, r2, and r3 are distances to each reflector, (x1,y1, z1), (x2,y2,z2) and (x3,y3,z3) are the three-dimensional coordinates of the retroreflectors, and x, y, and z are the coordinates to be determined that identify the position of the device.

The position may be displayed as a set of coordinates and/or as a point on a map display. The display may be a component of the device or a remote display (e.g., vehicle dashboard display).

In one embodiment, the retroreflectors 108 are fixed and positioned in the field using conventional surveying or position location techniques, e.g., GNSS positioning. Additionally, the device 102 may be used to determine locations of additional retroreflectors. The unique code of each retroreflector is associated with the known position to create a database of code-locations that are used as described below to facilitate device position determination. In other embodiments, as described below, a retroreflector 108 may be non-stationary (e.g., positioned on a vehicle or aircraft). For such a non-stationary reflector, the location information associated with the code is continuously updated in the database.

The transceiver 112 may be coupled to a computer 114. The computer 114 may be a conventional computing device as described in more detail with respect to FIG. 2. In one embodiment, the computer may comprise a memory containing a database of retroreflector locations such that the device 102 computes its position without additional information. In another embodiment, the device 106 may receive additional information from a remote source. For example, the device 102 may communicate to a server 106 via a communications network 104. The network 104 may be wired, wireless, or a combination of wired and wireless. The server 106 comprises one or more databases 110 of information. For example, the database 110 may contain retroreflector geographic location information that is identifiable using a received retroreflector code. As mentioned above and described further below, this database may be located within the computer 114 of the device 102. In the alternative embodiment, the device 102 may send a received retroreflector code to the server 106 and the server may "look up" the location of the specific retroreflector 108 and send the location to the device 102 to facilitate computation of the device's position. In other embodiments, the database(s) 110 may include the locations of all the retroreflectors (or all retroreflectors in a given region) such that the retroreflector locations may be placed on a map for easy identification by a user.

Through use of the OPS 100, the device's position may be determined without the use of RF signals. As such, the OPS 100 provides a robust position location system that is immune to jamming and other signal interference that is common with GNSS based position location systems.

Figure 2:
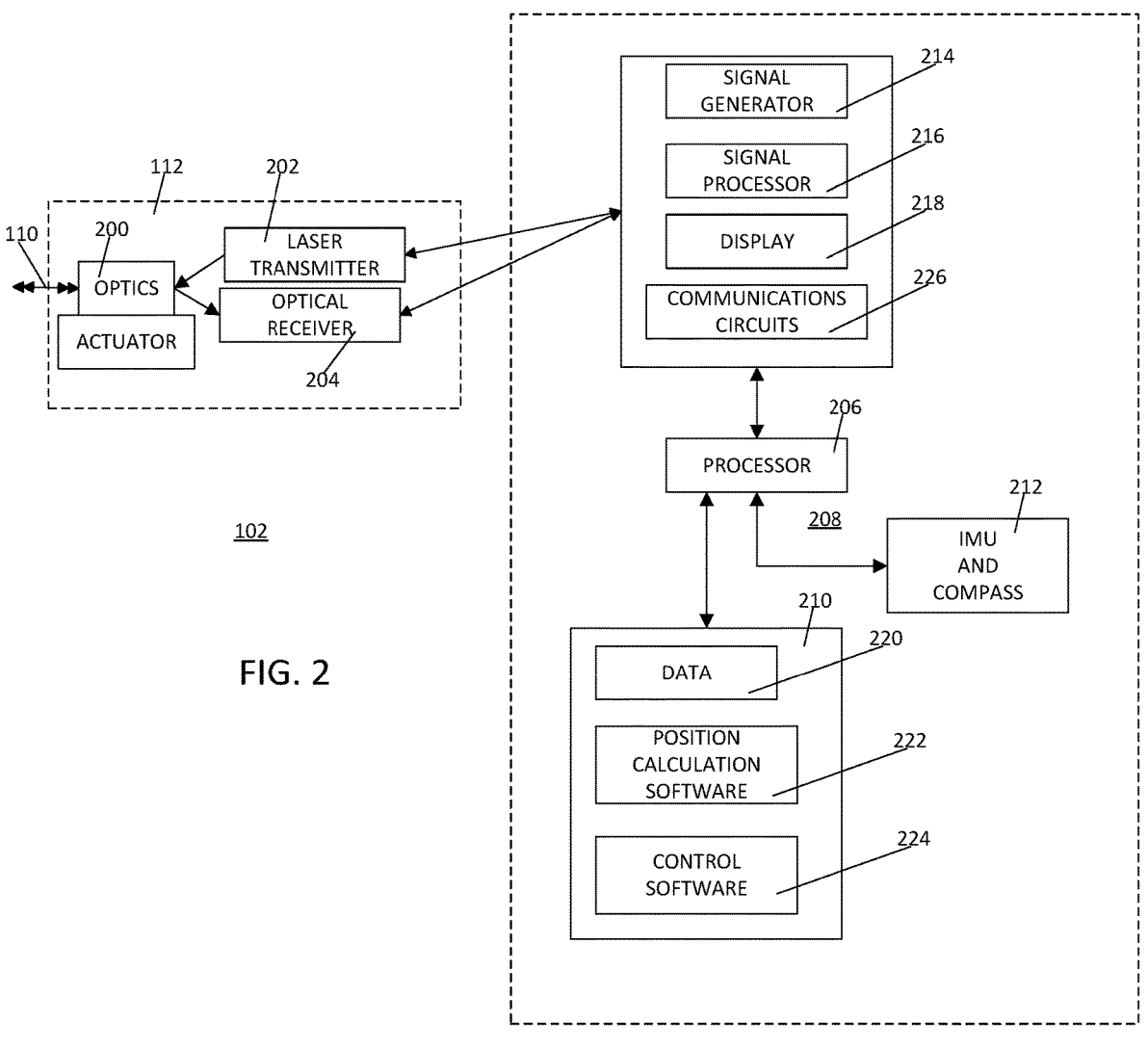
FIG. 2 depicts a block diagram of a laser transceiver of FIG. 1 in accordance with at least one embodiment of the present invention.

FIG. 2 depicts a block diagram of an end-user device 102 of FIG. 1 in accordance with an embodiment of the present invention. The end-user device 102 comprises a laser transceiver 112 and a computer 114. The laser transceiver 112 comprises optics 200, a laser transmitter 202, an optical receiver 204. The computer 114 comprises at least one processor 206, support circuits 208, memory 210 and an optional inertial measurement unit (IMU) and compass 212. The optics 200 may include, but are not limited to, one or more lenses, one or more collimators, one or more filters, antireflective coatings, and/or the like. The optics 200 may further include an actuator 203 to facilitate scanning or pointing of the transmitted laser in a specified direction or scanning in a 360-degree area surrounding the device. As such, in one embodiment, the laser beam may be manually pointed toward a retroreflector and, in other embodiments, the laser beam may be scanned or pointed to automatically find retroreflectors.

The laser transmitter 202 may be any form of laser transmitter capable of generating a laser beam. In one exemplary embodiment, the laser may be a solid-state laser operating at a wavelength, for example, of 1550 nm. The optical receiver 204 may be any form of laser light detector that is capable of receiving a reflected laser beam produced by the laser transmitter 202 and generating a signal output representing the retroreflector code.

The end-user device 102 may include one or more processors as part of the processor(s) 206, any of which, either individually or in combination, are capable of performing the operations described herein. Some processing to fulfill the functions of the device may be performed locally, may be performed remotely on server 106 of FIG. 1, or may be shared and performed locally and remotely on a platform. For example, the processor(s) 206 may comprise, one or more or any combination of, microprocessors, microcontrollers, central processing units (CPUs), graphics processing units (GPUs), digital signal processors (DSPs), field programmable gate arrays (FPGAs), application specific integrated circuits (ASICs), or the like.

The support circuits 208 comprise circuits and devices that support the functionality of the processor(s) 206. The support circuits 208 may comprise, one or more or any combination of clock circuits, communications circuits, cache memory, power supplies, interface circuits for the laser transmitter and receiver 202/204, and the like. More specifically, the support circuits 208 may comprise a signal generator 214, a signal processor 216, a display 218 and communications circuits 226. The signal generator 214 produces the control signals for the laser transmitter 202, i.e., control pulses to activate and deactivate the laser beam 110. The signal processor 216 may comprise one or more of filters, digitizers, demodulators, amplifiers, and combinations thereof capable of processing the received laser signal and extracting the retroreflector code. Some or all signal processor functions may be performed by the processor 206. The display 218 may be a component of the end-user device 102 or may be remotely located, e.g., a dashboard display in a vehicle. The display 218 forms a user interface to control the device 102 as well as display information to a user, e.g., but not limited to, map of retroreflector locations, navigation maps, graphical and/or textual location of the device, and the like.

Memory 210 is an example of non-transitory computer readable media capable of storing instructions which, when executed by any of the one or more processor(s) 206, cause the end-user device 102 to perform any one or more of the optical position system operations described herein. The memory 210 can store an operating system and one or more software applications, instructions, programs, and/or data to implement the methods described herein and the functions attributed to the various systems. In various implementations, the memory 210 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 210 is capable of storing data 220 from the signal processor 216 and/or processor 206. The data 220 may include the received retroreflector identification code, retroreflector locations, distance to one or more retroreflectors, and one or more device positions.

The memory 210 may store various programs such as, for example, but not limited to, a position calculation software 222 and control software 224. The position calculation software 222 processes the retroreflector locations and their related distance from the device to determine the position of the device 102. As is disclosed below with reference to FIG. 3, the position calculation software uses well-known triangulation techniques to process the location of and distance to at least three retroreflector reference locations and determine the device's position relative to the retroreflectors. From the relative position, the software 222 determines the geographic coordinates of the device 102.

The control software 224, when executed by the processor 206, performs command and control of the device 102. For example, the control software 224 may control laser scanning/pointing, laser activation times, signal processing, and other functions of the device 102. Operation of the control software is described in detail with reference to FIG. 3 below.

One or more communication circuits 226 within the support circuits 208 are used for communicating data to and from the server 106 of FIG. 1. Such communications circuits may use protocols that include, but are not limited to, WiFi (802.11), Bluetooth, Zigbee, Universal Serial Bus (USB), Ethernet, TCP/IP, serial communication, and the like. In at least one example, the communicated data may include retroreflector locations, retroreflector codes, maps, navigation information, device position, and the like.

The end-user device 102 may optionally comprise an IMU and compass 212 to facilitate knowing the position of the device as the device moves. Without an IMU, the device 102 must receive reflected signals from three or more retroreflectors while the device 102 is stationary. From these reflected signals, the device position can be calculated via triangulation. Once moved, the device requires at least three reflected signals to again calculate its new position. Alternatively, with an IMU 212, the device 102 can be mobile and receive reflected signals "on the fly." The IMU 212 tracks the change in position and updates the position of the device as it moves. From the known change in position, the IMU adjusts the previously measured distance to the known retroreflector reference locations such that additional reference locations and distances to those locations may be computed and used for correcting the device position. The end-user device 102 may optionally comprise a clock which allows the end-user devices to perform a time-transfer function.

Figure 3:
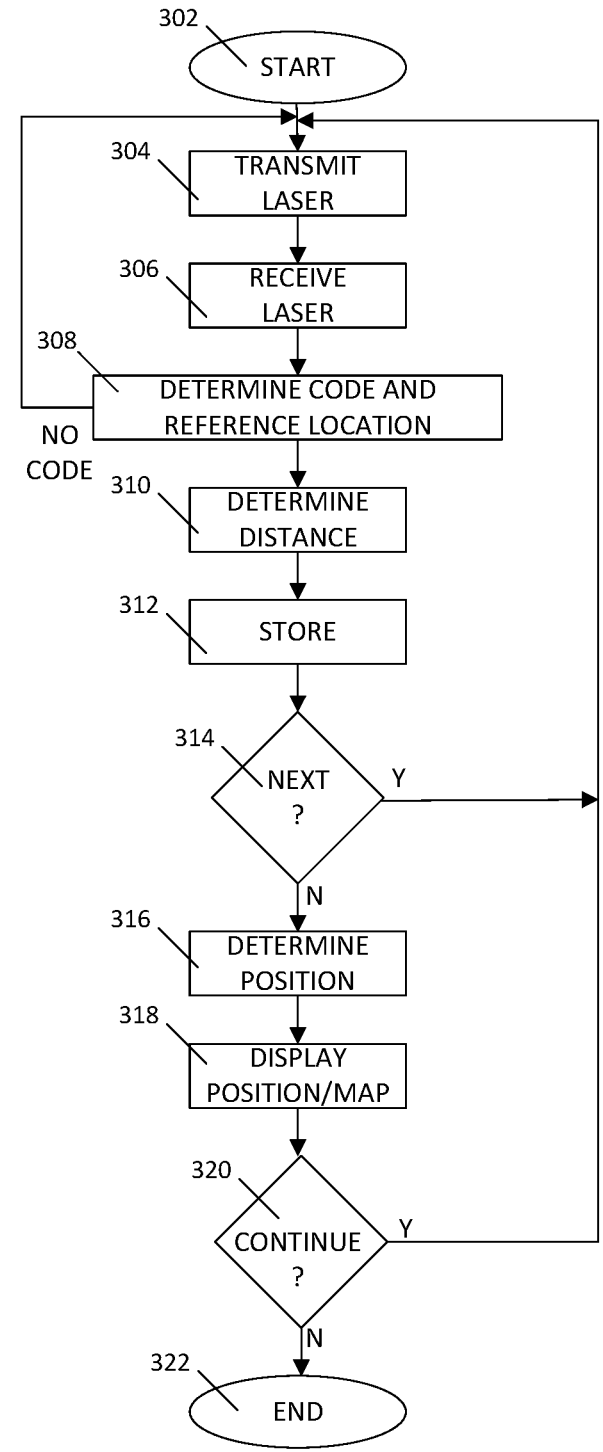
FIG. 3 depicts a flow diagram of a method of operation for the laser transceiver of FIG. 2 in accordance with at least embodiment of the present invention.

FIG. 3 depicts a flow diagram of a method 300 of operation for the device of FIG. 2 in accordance with an embodiment of the present invention. The method 300 starts at 302 and proceeds to 304 where the laser beam is transmitted. The laser may be pulsed or continuously activated with a waveform. In various embodiments, the laser beam may be automatically scanned/pointed or may be manually pointed toward a retroreflector. The retroreflector modulates the incident laser with a unique code identifying the retroreflector. At 306, the optical (laser) receiver receives a reflected laser beam that is reflected and modulated from a retroreflector and the signal processor demodulates the signal to obtain the code.

At 308, the method 300 determines the code associated with the retroreflector. The code is a unique digital sequence that is associated with the specific retroreflector. The code is compared to a database of codes and the location of the retroreflector associated with the code. The location forms a reference location. In one embodiment, the code database is remotely located and accessible through interaction with the server 106 of FIG. 1. As such, the device 102 sends the code to the server and the server responds with the reference location. In other embodiments, the entire code database or a portion thereof may be transferred to the device and the reference locations may be determined locally within the device. If a code is not received, the method 300 proceeds from 308 to 304 to find another retroreflector or retry to locate the current reflector. The database may have a look up table format where each unique code is correlated with a location. The database may have a form such as shown in TABLE 1.

TABLE 1

| CODE | LOCATION |
|---|---|
| 000001 | x1,y1,z1 |
| 000010 | x2,y2,z2 |
| 000011 | X3,y3,z3 |
| . | . |
| . | . |
| . | . |

At 310, the method 300 determines a distance from the device to the retroreflector by processing the received laser signal using interferometry technique or other well-known distance computation technique such as method used by commercial laser rangers. At 312, the method 300 stores the reference location and the distance.

At 314, the method 300 queries whether another retroreflector is to be processed. If less than three have been processed, the method 300 proceeds from 314 to 304 to find another retroreflector. If at least three reference locations and distances have been determined, the method 300 has enough samples to determine a device position and proceeds to 316.

At 316, the method 300 executes the position calculation software to determine the current device position. In one embodiment, the reference locations and distances to the reference locations are processed using a well-known triangulation technique to determine the device position in, for example, geographic coordinates. If an IMU is used, the end-user device can navigate to a new location in relative short distances and estimate position changes. After an accurate device position is computed, the IMU position estimate is corrected using the newly determined device position.

At 318, the end-user device position is displayed. In one embodiment, the display (218 in FIG. 2) may display the geographic coordinates. In other embodiments, the device may utilize a graphical map display and place a point on the map representing the location of the device. In further embodiments, the map may display the locations of retrore-flectors such that the device may be easily pointed toward additional retroreflectors. An exemplary embodiment of a graphical map is described with reference to FIG. 4 below. The more reference locations and distances used in the position calculation, the more accurate the position is determined. Retroreflector locations may be color coded to indicate whether the retroreflector has been previously identified and used in the position calculation or not. To assist in manually pointing the device, the device may contain a compass—either a mechanical compass or a graphical compass created in the display. Furthermore, the known locations of retroreflectors may be used to direct an automatic laser scanner to point the laser at each of the unused retroreflectors that are in line of sight with the laser device.

At 320, the method 300 queries whether the method should continue to process additional retroreflectors. If the query is affirmatively answered, the method 300 proceeds to 304. If the query is negatively answered, the method 300 ends at 322.

The foregoing embodiments assumed the retroreflectors were located in fixed, ground-based reference locations. In alternative embodiments, one or more end user devices and retroreflectors may be mounted to an aircraft such as an unmanned aerial vehicle (UAV), balloon, helicopter, airplane, and the like. Such a retroreflector may be coupled to a device (as described above) or a GPS unit such that the device/GPS unit computes the vehicle's position and codes (modulates) the position into the retroreflector or continuously updates the location within the code-location database. Consequently, a location of the retroreflector is continuously updated and is directly accessed from a reflected laser beam. In this manner, ground based devices can use the flying retroreflector as a reference location.

The foregoing embodiments may use programmable retroreflectors to code the retroreflector code into the retrore-flector. In other embodiments, the code may be created by a specific pattern etched in the surface of the retroreflector. In further embodiments, the retroreflectors may be programmed with the reference location for the retroreflector such that the device does not need to determine the reference location using a retroreflector identification code. Rather the reference location may be extracted directly from the modulated, reflected laser beam. In this embodiment, the code itself includes the retroreflector location (e.g., the surface of the retroreflector may comprise a digital code representing a location (x, y, z) or an encrypted location coordinate).

Once a reasonable number of the retroreflectors are deployed in a regional area, there can be unlimited expansion for end-users (end-user devices).

Figure 4:
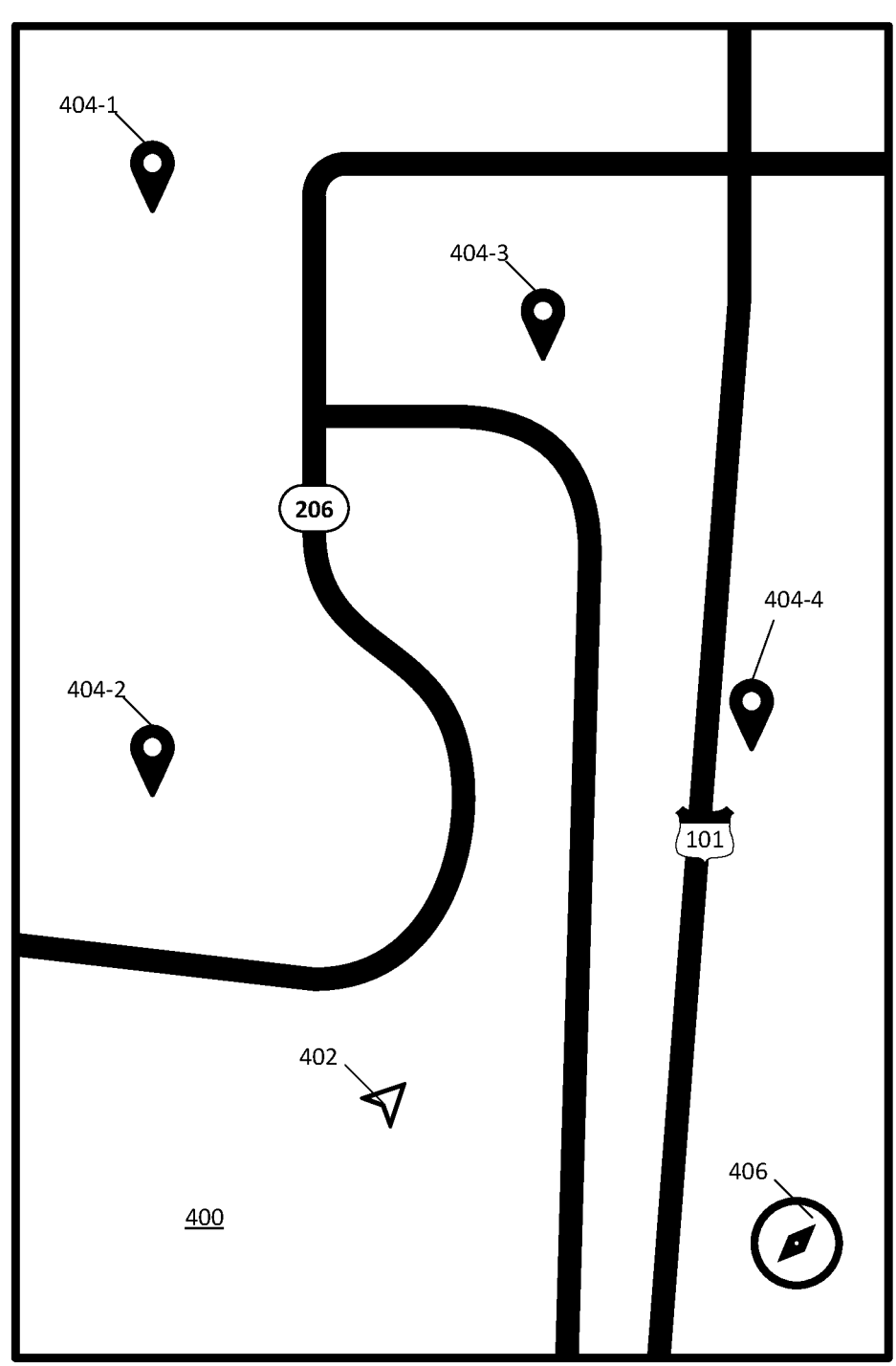
FIG. 4 depicts an exemplary map in accordance with at least one embodiment of the present invention.

FIG. 4 depicts an exemplary map that may be displayed on the device or on a remote display screen in accordance with at least one embodiment of the present invention. The map 400 comprises a device location icon 402 indicating the location of the end user device. The icon 402 may be directional such that a user is provided an indication of the direction the laser is pointed. The map 400 comprises retroreflector location icons 404-1, 404-2, 404-3 and 404-4 (collectively referred to as retroreflector icons 404) that are positioned on the map at the known locations of the retrore-flectors (e.g., known from the retroreflector location database as described above). The map 400 may also comprise a compass icon 406 to enable a user to understand the direction which the device is pointing. Using the map 400, a user may point the device's laser in the direction of each of the retroreflector icons 404 to gather distance and location information to enable the device to determine the position of the device.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for performing optical positioning and navigating comprising:

a laser transceiver configured to transmit a laser beam, which is pulsed or continuously activated with a waveform, toward a retroreflector located in a known position as a location reference, where the retroreflector reflects the laser beam back into the incoming laser beam's direction and imparts modulation onto the reflected laser beam corresponding to a retroreflector code;

an optical receiver in the laser transceiver configured to receive a laser beam reflected from the retroreflector;

one or more of filters, digitizers, demodulators, amplifiers, and combinations thereof configured to perform demodulation processing on the received laser beam to determine a retroreflector code;

an inertial measurement unit;

a compass; and a processor configured to determine a distance from the apparatus to the retroreflector and demodulated retroreflector code to determine the location of the retroreflector, use the code and distance to determine a position of the apparatus based on the pulse or waveform of the laser beam; and determine a new position with the inertial measurement unit and the compass outside the original retroreflector's area to deploy a new retroreflector.

2. The apparatus of claim 1 wherein the processor is configured to use the code to determine a reference location of the retroreflector.

3. The apparatus of claim 1 wherein the inertial measurement unit is configured to generate a change of position estimate for the apparatus as it moves relative to the retroreflector between location determinations.

4. The apparatus of claim 3 wherein the position is used to correct a position estimate generated by the inertial measurement unit.

5. The apparatus of claim 1 further comprising a display configured to display the position of the apparatus on a map and/or location(s) of one or more retroreflectors on the map.

6. The apparatus of claim 1 further comprising communication means for communicating with a server comprising a database of at least one retroreflector code associated with a reference location.

7. The apparatus of claim 1 wherein the retroreflector is ground-based or air-based.

8. An optical positioning and navigating system comprising:

an end-user device comprising the apparatus of claim 1; and a server, communicatively coupled to the end user device, comprising a database of at least one retroreflector code associated with a reference location.

9. The optical positioning and navigating system of claim 8 wherein the end-user device further comprises an inertial measurement unit configured to generate a change of a position estimate for the end-user device.

10. The optical positioning and navigating system of claim 9 wherein the position is used to correct the position estimate generated by the inertial navigation unit.

11. The apparatus of claim 1 further comprising a clock to enable performance of a time-transfer function.

12. The apparatus of claim 1 further comprising an automated laser scanner to rotationally scan the laser beam or to point the laser beam at the expected location of a retroreflector.

13. An optical positioning system comprising:

at least three active-retroflectors having a reflective surface which reflects light back into the incoming light's direction, wherein at least a portion of the reflective surface comprises a pattern which, when reflecting light, imparts modulation onto the reflected light corresponding to a retroreflector code; and the apparatus of claim 1 configured to determine a position based on retroreflector codes from the at least three active-retroflectors and distances from the at least three active-retroflectors by triangulation calculations.

14. The apparatus of claim 1, wherein once three retroreflectors have been deployed, the apparatus can navigate within the three retroreflectors' area without using the inertial measurement unit and the compass.

15. A method of performing optical positioning and navigating of a system, the method comprising:

transmitting a laser beam toward a retroreflector, which is pulsed or continuously activated with a waveform, where the retroreflector reflects the laser beam back into the incoming laser beam's direction and imparts modulation onto the reflected laser beam corresponding to a retroreflector code;

receiving a laser beam reflected from the retroreflector;

performing demodulation processing on the received laser beam to determine a retroreflector code;

determining a distance to the retroreflector based on the pulse or waveform of the laser beam;

using the demodulated retroreflector code and distance to determine a position;

determining a new position using an inertial measurement unit and a compass outside the original retroreflector's area; and deploying a new retroreflector at the new position.

16. The method of claim 15 further comprising using the code to determine a reference location.

17. The method of claim 15 further comprising generating a change of a position estimate with the inertial measurement unit and the compass.

18. The method of claim 17 further comprising using the position to correct the position estimate generated by the inertial measurement unit.

19. The method of claim 15 further comprising displaying the position of the system on a map and/or displaying location(s) of one or more retroreflectors on the map.

20. The method of claim 15 further comprising communicating with a server comprising a database of at least one retroreflector code associated with a reference location.

21. The method of claim 15 further comprising: programming the new retroreflector with a retroreflector code corresponding to the new position.

* * * * *